US012315280B2

(12) United States Patent
Alouane et al.

(10) Patent No.: US 12,315,280 B2
(45) Date of Patent: May 27, 2025

(54) SYSTEMS AND METHODS FOR DETECTION AND EXTRACTION OF BORDERLESS CHECKBOX TABLES

(71) Applicant: FMR LLC, Boston, MA (US)

(72) Inventors: Mohamed Mahdi Alouane, Toronto (CA); Shyam Subramanian, Norwood, MA (US); Hui Su, West Roxbury, MA (US)

(73) Assignee: FMR LLC, Boston, MA (US)

( * ) Notice: Subject to any disclaimer, the term of this patent is extended or adjusted under 35 U.S.C. 154(b) by 436 days.

(21) Appl. No.: 17/900,077

(22) Filed: Aug. 31, 2022

(65) Prior Publication Data

US 2024/0071119 A1    Feb. 29, 2024

(51) Int. Cl.
| | | |
|---|---|---|
| *G06K 9/00* | (2022.01) | |
| *G06F 40/177* | (2020.01) | |
| *G06V 30/412* | (2022.01) | |
| *G06V 30/413* | (2022.01) | |
| *G06V 30/416* | (2022.01) | |

(52) U.S. Cl.
CPC .......... *G06V 30/412* (2022.01); *G06F 40/177* (2020.01); *G06V 30/413* (2022.01); *G06V 30/416* (2022.01)

(58) Field of Classification Search
CPC .. G06V 30/412; G06V 30/413; G06V 30/416; G06F 40/177
See application file for complete search history.

(56) References Cited

U.S. PATENT DOCUMENTS

| | | | | |
|---|---|---|---|---|
| 9,946,690 | B2* | 4/2018 | Sesum | G06V 30/414 |
| 9,990,347 | B2* | 6/2018 | Raskovic | G06F 40/177 |
| 10,339,212 | B2* | 7/2019 | Agrawal | G06N 7/01 |
| 10,706,228 | B2* | 7/2020 | Buisson | G06F 40/163 |
| 10,817,717 | B2* | 10/2020 | Yu | G06V 30/413 |
| 2020/0342221 | A1* | 10/2020 | Sampath | G06V 30/412 |
| 2022/0222284 | A1* | 7/2022 | Sahoo | G06F 16/316 |
| 2024/0296689 | A1* | 9/2024 | Prasad | G06V 30/26 |

\* cited by examiner

*Primary Examiner* — Avinash Yentrapati
(74) *Attorney, Agent, or Firm* — Cesari and McKenna, LLP

(57) ABSTRACT

Described herein are systems and methods for extracting borderless checkbox tables from electronic documents. A server detects checkboxes in a textual electronic document. The server extracts text blocks from the textual electronic document. The server identifies table headers corresponding to a borderless checkbox table in the textual electronic document based on the text blocks. The server determines a table boundary corresponding to the borderless checkbox table based on the table headers. The server identifies table rows and table columns corresponding to the borderless checkbox table based on the table boundary and the checkboxes. The server identifies table cells corresponding to the borderless checkbox table based on the table rows and the table columns. The server generates a data structure comprising data representing the borderless checkbox table based on at least the table cells and the checkboxes.

20 Claims, 16 Drawing Sheets

Volume Submitter 401(k) Profit Sharing Plan j. ☐ Other:      1. ☐    OR    2. ☐    3. ☐    4. ☐

(must be definitely determinable, may not be based on age or length of service (except in a manner consistent with i. above) or level of Compensation, and, if using the average benefits test to satisfy Code §410(b) coverage testing, must be a reasonable classification)

k. ☐ Other: _____ (must (1) specify contributions to which exclusions apply, (2) be definitely determinable and not based on age or length of service (except in a manner consistent with i. above) or level of Compensation, and, (3) if using the average benefits test to satisfy Code §410(b) coverage testing, be a reasonable classification).

14. CONDITIONS OF ELIGIBILITY (Plan Section 3.1)

a. ☐ No age or service required. No age or service required for all contribution types (skip to Question 15).
b. ☒ Eligibility - same for all contribution types. An Eligible Employee will be eligible to participate in the Plan for all contribution types upon satisfaction of the following (select one or more of e. - n. below; also select 1. (All Contributions) for each condition selected at e. - m.):
c. ☐ Eligibility - different conditions apply. An Eligible Employee will be eligible to participate in the Plan upon satisfaction of the following either for all contribution types or to the designated contribution type (select one or more of d. - n. below; also select 1. OR all that apply of 2. - 4. for each condition selected at d. - m.):

NOTE: Unless otherwise specified in this Section, Elective Deferrals include Roth Elective Deferrals, after-tax voluntary Employee contributions, and rollover contributions (unless otherwise selected at Question 46); Matching includes QMACs; and Nonelective Profit Sharing includes QNECs. "ADP test safe harbor contributions" (SH) (including those made pursuant to a QACA) and SIMPLE 401(k) contributions are subject to the conditions for Elective Deferrals except as provided in Question 27.

| Eligibility Conditions | All Contributions | | Elective Deferrals/SH | Matching | Nonelective Profit Sharing |
|---|---|---|---|---|---|
| d. No age or service required | N/A | | 2. ☐ | 3. ☐ | 4. ☐ |
| e. Age 20 1/2 | 1. ☐ | OR | 2. ☐ | 3. ☐ | 4. ☐ |
| f. Age 21 | 1. ☐ | OR | 2. ☐ | 3. ☐ | 4. ☐ |
| g. Age _18_ (may not exceed 21) | 1. ☒ | OR | 2. ☐ | 3. ☐ | 4. ☐ |
| h. ____ (not to exceed 12) months of service (elapsed time) | 1. ☐ | OR | 2. ☐ | 3. ☐ | 4. ☐ |
| i. 1 Year of Service | 1. ☐ | OR | 2. ☐ | 3. ☐ | 4. ☐ |
| j. 2 Years of Service | N/A | OR | N/A | 3. ☐ | 4. ☐ |
| k. ____ (not to exceed 12) consecutive month period from the Eligible Employee's employment commencement date and during which at least ____ (not to exceed 1,000) Hours of Service are completed. If an Employee does not complete the stated Hours of Service during the specified time period, the Employee is subject to the 1 Year of Service requirement in i. above. | 1. ☐ | OR | 2. ☐ | 3. ☐ | 4. ☐ |
| l. ____ (not to exceed 12) consecutive months of employment from the Eligible Employee's employment commencement date. If an Employee does not complete the stated number of months, the Employee is subject to the 1 Year of Service requirement in i. above. | 1. ☐ | OR | 2. ☐ | 3. ☐ | 4. ☐ |
| m. Other: _90 days of consecutive employment_ (e.g., date on which 1,000 Hours of Service is completed within the computation period) (must satisfy the Notes below) | 1. ☒ | OR | 2. ☐ | 3. ☐ | 4. ☐ | n. ☐ Other: _____ (e.g., date on which 1,000 Hours of Service is completed within the computation period) (must specify contributions to which conditions apply and satisfy the Notes below)

NOTE: If m. or n. is selected, the condition must be an age or service requirement that is definitely determinable and may not exceed age 21 and for Elective Deferrals, 1 Year of Service; for Employer matching and/or Nonelective profit sharing contributions, may not exceed 2 Years of Service. If more than 1 Year of Service is required for Employer matching and/or Nonelective profit sharing contributions, 100% immediate vesting is required.

© 2014 Nationwide Financial Services, Inc. or its suppliers

Volume Submitter 401(k) Profit Sharing Plan j. Other: _____ 1.[ ]   OR   2.[ ]   3.[ ]   4.[ ]
(must be definitely determinable, may not be based on age or length of service (except in a manner consistent with i. above) or level of Compensation, and, if using the average benefits test to satisfy Code §410(b) coverage testing, must be a reasonable classification)

k. [ ] Other: _____ (must (1) specify contributions to which exclusions apply, (2) be definitely determinable and not based on age or length of service (except in a manner consistent with i. above) or level of Compensation, and, (3) if using the average benefits test to satisfy Code §410(b) coverage testing, be a reasonable classification).

14. CONDITIONS OF ELIGIBILITY (Plan Section 3.1)
   a. [ ] No age or service required. No age or service required for all contribution types (skip to Question 15).
   b. [X] Eligibility - same for all contributions types. An Eligible Employee will be eligible to participate in the Plan for all contribution types upon satisfaction of the following (select one or more of e. - n. below; also select 1. (All Contributions) for each condition selected at e. - m.):
   c. [ ] Eligibility - different conditions apply. An Eligible Employee will be eligible to participate in the Plan upon satisfaction of the following either for all contribution types or to the designated contribution type (select one or more of d. - n. below; also select 1. OR all that apply of 2. - 4. for each condition selected at d. - m.):

NOTE: Unless otherwise specified in this Section, Elective Deferrals include Roth Elective Deferrals, after-tax voluntary Employee contributions, and rollover contributions (unless otherwise selected at Question 46); Matching includes QMACs; and Nonelective Profit Sharing includes QNECs. "ADP test safe harbor contributions" (SH) (including those made pursuant to a QACA) and SIMPLE 401(k) contributions are subject to the conditions for Elective Deferrals except as provided in Question 22.

| Eligibility Conditions: | All Contributions | | Elective Deferrals/SH | Matching | Nonelective Profit Sharing |
|---|---|---|---|---|---|
| d. No age or service required | N/A | | 2.[ ] | 3.[ ] | 4.[ ] |
| e. Age 20 1/2 | 1.[ ] | OR | 2.[ ] | 3.[ ] | 4.[ ] |
| f. Age 21 | 1.[ ] | OR | 2.[ ] | 3.[ ] | 4.[ ] |
| g. Age _18_ (may not exceed 21) | 1.[X] | OR | 2.[ ] | 3.[ ] | 4.[ ] |
| h. _____ (not to exceed 12) months of service (elapsed time) | 1.[ ] | OR | 2.[ ] | 3.[ ] | 4.[ ] |
| i. 1 Year of Service | 1.[ ] | OR | 2.[ ] | 3.[ ] | 4.[ ] |
| j. 2 Years of Service | N/A | OR | N/A | 3.[ ] | 4.[ ] |
| k. _____ (not to exceed 12) consecutive month period from the Eligible Employee's employment commencement date and during which at least _____ (not to exceed 1,000) Hours of Service are completed. If an Employee does not complete the stated Hours of Service during the specified time period, the Employee is subject to the 1 Year of Service requirement in i. above. | 1.[ ] | OR | 2.[ ] | 3.[ ] | 4.[ ] |
| l. _____ (not to exceed 12) consecutive months of employment from the Eligible Employee's employment commencement date. If an Employee does not complete the stated number of months, the Employee is subject to the 1 Year of Service requirement in i. above. | 1.[ ] | OR | 2.[ ] | 3.[ ] | 4.[ ] |
| m. Other: _90 days of consecutive employment_ (e.g., date on which 1,000 Hours of Service is completed within the computation period) (must satisfy the Notes below) | 1.[X] | OR | 2.[ ] | 3.[ ] | 4.[ ] | n. [ ] Other: _____ (e.g., date on which 1,000 Hours of Service is completed within the computation period) (must specify contributions to which conditions apply and satisfy the Notes below)

NOTE: If m. or n. is selected, the condition must be an age or service requirement that is definitely determinable and may not exceed age 21 and for Elective Deferrals, 1 Year of Service; for Employer matching and/or Nonelective profit sharing contributions, may not exceed 2 Years of Service. If more than 1 Year of Service is required for Employer matching and/or Nonelective profit sharing contributions, 100% immediate vesting is required.

© 2014 Nationwide Financial Services, Inc. or its suppliers

FIG. 6

Volume Submitter 401(k) Profit Sharing Plan j. Other: _____ 1.[ ]   OR   2.[ ]   3.[ ]   4.[ ]

(must be definitely determinable, may not be based on age or length of service (except in a manner consistent with i. above) or level of Compensation, and, if using the average benefits test to satisfy Code §410(b) coverage testing, must be a reasonable classification)

k. [ ] Other: _____ (must (1) specify contributions to which exclusions apply, (2) be definitely determinable and not based on age or length of service (except in a manner consistent with i. above) or level of Compensation, and, (3) if using the average benefits test to satisfy Code §410(b) coverage testing, be a reasonable classification).

14. CONDITIONS OF ELIGIBILITY (Plan Section 3.1)
   a. [ ] No age or service required. No age or service required for all contributions types (skip to Question 15).
   b. [X] Eligibility - same for all contribution types. An Eligible Employee will be eligible to participate in the Plan for all contribution types upon satisfaction of the following (select one or more of c. - n. below; also select 1. (All Contributions) for each condition selected at c. - m.):
   c. [ ] Eligibility - different conditions apply. An Eligible Employee will be eligible to participate in the Plan upon satisfaction of the following either for all contribution types or to the designated contribution type (select one or more of d. - n. below; also select 1. OR all that apply of 2. - 4. for each condition selected at d. - m.):

702 → NOTE: Unless otherwise specified in this Section, Elective Deferrals include Roth Elective Deferrals, after-tax voluntary Employee contributions, and rollover contributions (unless otherwise selected at Question 46); Matching includes QMACs; and Nonelective Profit Sharing includes QNECs. "ADP test safe harbor contributions" (SH) (including those made pursuant to a QACA and SIMPLE 401(k) contributions are subject to the conditions for Elective Deferrals except as provided in Question 27.

| Eligibility Conditions | All Contributions | Elective Deferrals/SH | Matching | Nonelective Profit Sharing |
|---|---|---|---|---|
| d. No age or service required | N/A | 2.[ ] | 3.[ ] | 4.[ ] |
| e. Age 20 1/2 | 1.[ ] OR | 2.[ ] | 3.[ ] | 4.[ ] |
| f. Age 21 | 1.[ ] OR | 2.[ ] | 3.[ ] | 4.[ ] |
| g. Age _18_ (may not exceed 21) | 1.[X] OR | 2.[ ] | 3.[ ] | 4.[ ] |
| h. ___ (not to exceed 12) months of service (elapsed time) | 1.[ ] OR | 2.[ ] | 3.[ ] | 4.[ ] |
| i. 1 Year of Service | 1.[ ] OR | 2.[ ] | 3.[ ] | 4.[ ] |
| j. 2 Years of Service | N/A | OR N/A | 3.[ ] | 4.[ ] |
| k. ___ (not to exceed 12) consecutive month period from the Eligible Employee's employment commencement date and during which at least ___ (not to exceed 1,000) Hours of Service are completed. If an Employee does not complete the stated Hours of Service during the specified time period, the Employee is subject to the 1 Year of Service requirement in i. above. | 1.[ ] OR | 2.[ ] | 3.[ ] | 4.[ ] |
| l. ___ (not to exceed 12) consecutive months of employment from the Eligible Employee's employment commencement date. If an Employee does not complete the stated number of months, the Employee is subject to the 1 Year of Service requirement in i. above. | 1.[ ] OR | 2.[ ] | 3.[ ] | 4.[ ] |
| m. Other: _90 days of consecutive employment_ (e.g., date on which 1,000 Hours of Service is completed within the computation period) (must satisfy the Notes below) | 1.[X] OR | 2.[ ] | 3.[ ] | 4.[ ] |
| n. [ ] Other: ___ (e.g., date on which 1,000 Hours of Service is completed within the computation period) (must specify contributions to which conditions apply and satisfy the Notes below). | | | | |

704 → NOTE: If m. or n. is selected, the condition must be an age or service requirement that is definitely determinable and may not exceed age 21 and for Elective Deferrals, 1 Year of Service; for Employer matching and/or Nonelective profit sharing contributions, may not exceed 2 Years of Service. If more than 1 Year of Service is required for Employer matching and/or Nonelective profit sharing contributions, 100% immediate vesting is required.

© 2014 Nationwide Financial Services, Inc. or its suppliers

FIG. 7

Volume Submitter 401(k) Profit Sharing Plan j. Other: _____  1.[ ]  OR  2.[ ]  3.[ ]  4.[ ]

(must be definitely determinable, may not be based on age or length of service (except in a manner consistent with i. above) or level of Compensation, and, if using the average benefits test to satisfy Code §410(b) coverage testing, must be a reasonable classification)

k. [ ] Other: _____ (must (1) specify contributions to which exclusions apply, (2) be definitely determinable and not based on age or length of service (except in a manner consistent with i. above) or level of Compensation, and, (3) if using the average benefits test to satisfy Code §410(b) coverage testing, be a reasonable classification).

14. CONDITIONS OF ELIGIBILITY (Plan Section 3.1)
   a. [ ] No age or service required. No age or service required for all contribution types (skip to Question 15).
   b. [X] Eligibility - same for all contribution types. An Eligible Employee will be eligible to participate in the Plan for all contribution types upon satisfaction of the following (select one or more of e. - n. below; also select 1. (All Contributions) for each condition selected at e. - m.):
   c. [ ] Eligibility - different conditions apply. An Eligible Employee will be eligible to participate in the Plan upon satisfaction of the following either for all contribution types or to the designated contribution type (select one or more of d. - n. below; also select 1. OR all that apply of 2. - 4. for each condition selected at d. - m.):

NOTE: Unless otherwise specified in this Section, Elective Deferrals include Roth Elective Deferrals, after-tax voluntary Employee contributions, and rollover contributions (unless otherwise selected at Question 46); Matching includes QMACs; and Nonelective Profit Sharing includes QNECs. "ADP test safe harbor contributions" (SH) (including those made pursuant to a QACA) and SIMPLE 401(k) contributions are subject to the conditions for Elective Deferrals except as provided in Question 27.

802 →

| Eligibility Conditions | All Contributions | Elective Deferrals/SH | Matching | Nonelective Profit Sharing |
|---|---|---|---|---|
| d. No age or service required | N/A | 2.[ ] | 3.[ ] | 4.[ ] |
| e. Age 20 1/2 | 1.[ ] | OR 2.[ ] | 3.[ ] | 4.[ ] |
| f. Age 21 | 1.[ ] | OR 2.[ ] | 3.[ ] | 4.[ ] |
| g. Age 18 (may not exceed 21) | 1.[X] | OR 2.[ ] | 3.[ ] | 4.[ ] |
| h. ___ (not to exceed 12) months of service (elapsed time) | 1.[ ] | OR 2.[ ] | 3.[ ] | 4.[ ] |
| i. 1 Year of Service | 1.[ ] | OR 2.[ ] | 3.[ ] | 4.[ ] |
| j. 2 Years of Service | N/A | OR N/A | 3.[ ] | 4.[ ] |
| k. ___ (not to exceed 12) consecutive month period from the Eligible Employee's employment commencement date and during which at least ___ (not to exceed 1,000) Hours of Service are completed. If an Employee does not complete the stated Hours of Service during the specified time period, the Employee is subject to the 1 Year of Service requirement in i. above. | 1.[ ] | OR 2.[ ] | 3.[ ] | 4.[ ] |
| l. ___ (not to exceed 12) consecutive months of employment from the Eligible Employee's employment commencement date. If an Employee does not complete the stated number of months, the Employee is subject to the 1 Year of Service requirement in i. above. | 1.[ ] | OR 2.[ ] | 3.[ ] | 4.[ ] |
| m. Other: 90 days of consecutive employment (e.g. date on which 1,000 Hours of Service is completed within the computation period) (must satisfy the Notes below) | 1.[X] | OR 2.[ ] | 3.[ ] | 4.[ ] |
| n. [ ] Other: ___ (e.g. date on which 1,000 Hours of Service is completed within the computation period) (must specify contributions to which conditions apply and satisfy the Notes below) | | | | |

804 → NOTE: If m. or n. is selected, the condition must be an age or service requirement that is definitely determinable and may not exceed age 21 and for Elective Deferrals, 1 Year of Service; for Employer matching and/or Nonelective profit sharing contributions, may not exceed 2 Years of Service. If more than 1 Year of Service is required for Employer matching and/or Nonelective profit sharing contributions, 100% immediate vesting is required.

© 2014 Nationwide Financial Services, Inc. or its suppliers

FIG. 8

Volume Submitter 401(k) Profit Sharing Plan j. Other: _____ 1.[ ] OR 2.[ ] 3.[ ] 4.[ ]
(must be definitely determinable, may not be based on age or length of service (except in a manner consistent with i. above) or level of Compensation, and, if using the average benefits test to satisfy Code §410(b) coverage testing, must be a reasonable classification)

k. [ ] Other: _____ (must (1) specify contributions to which exclusions apply, (2) be definitely determinable and not based on age or length of service (except in a manner consistent with i. above) or level of Compensation, and, (3) if using the average benefits test to satisfy Code §410(b) coverage testing, be a reasonable classification).

14. CONDITIONS OF ELIGIBILITY (Plan Section 3.1)
   a. [ ] No age or service required. No age or service required for all contribution types (skip to Question 15).
   b. [X] Eligibility - same for all contribution types. An Eligible Employee will be eligible to participate in the Plan for all contribution types upon satisfaction of the following (select one or more of e. - n. below; also select 1. (All Contributions) for each condition selected at e. - m.):
   c. [ ] Eligibility - different conditions apply. An Eligible Employee will be eligible to participate in the Plan upon satisfaction of the following either for all contribution types or to the designated contribution type (select one or more of d. - n. below; also select 1. OR all that apply of 2. - 4. for each condition selected at d. - m.):

NOTE: Unless otherwise specified in this Section, Elective Deferrals include Roth Elective Deferrals, after-tax voluntary Employee contributions, and rollover contributions (unless otherwise selected at Question 46); Matching includes QMACs; and Nonelective Profit Sharing includes QNECs. "ADP test safe harbor contributions" (SH) (including those made pursuant to a QACA) and SIMPLE 401(k) contributions are subject to the conditions for Elective Deferrals except as provided in Question 27.

| Eligibility Conditions | All Contributions | | Elective Deferrals/SH | Matching | Nonelective Profit Sharing |
|---|---|---|---|---|---|
| d. No age or service required | N/A | | 2.[ ] | 3.[ ] | 4.[ ] |
| e. Age 20 1/2 | 1.[ ] | | 2.[ ] | 3.[ ] | 4.[ ] |
| f. Age 21 | 1.[ ] | OR | 2.[ ] | 3.[ ] | 4.[ ] |
| g. Age _18_ (may not exceed 21) | 1.[X] | OR | 2.[ ] | 3.[ ] | 4.[ ] |
| h. _____ (not to exceed 12) months of service (elapsed time) | 1.[ ] | OR | 2.[ ] | 3.[ ] | 4.[ ] |
| i. 1 Year of Service | 1.[ ] | OR | 2.[ ] | 3.[ ] | 4.[ ] |
| j. 2 Years of Service | N/A | OR | N/A | 3.[ ] | 4.[ ] |
| k. _____ (not to exceed 12) consecutive month period from the Eligible Employee's employment commencement date and during which at least _____ (not to exceed 1,000) Hours of Service are completed. If an Employee does not complete the stated Hours of Service during the specified time period, the Employee is subject to the 1 Year of Service requirement in i. above. | 1.[ ] | OR | 2.[ ] | 3.[ ] | 4.[ ] |
| l. _____ (not to exceed 12) consecutive months of employment from the Eligible Employee's employment commencement date. If an Employee does not complete the stated number of months, the Employee is subject to the 1 Year of Service requirement in i. above. | 1.[ ] | OR | 2.[ ] | 3.[ ] | 4.[ ] |
| m. Other: _90 days of consecutive employment_ (e.g., date on which 1,000 Hours of Service is completed within the computation period) (must satisfy the Notes below) | 1.[X] | OR | 2.[ ] | 3.[ ] | 4.[ ] | n. [ ] Other: _____ (e.g., date on which 1,000 Hours of Service is completed within the computation period) (must specify contributions to which conditions apply and satisfy the Notes below)

NOTE: If m. or n. is selected, the condition must be an age or service requirement that is definitely determinable and may not exceed age 21 and for Elective Deferrals, 1 Year of Service; for Employer matching and/or Nonelective profit sharing contributions, may not exceed 2 Years of Service. If more than 1 Year of Service is required for Employer matching and/or Nonelective profit sharing contributions, 100% immediate vesting is required.

© 2014 Nationwide Financial Services, Inc. or its suppliers

FIG. 9

(Labels: 902a → Eligibility Conditions; 902b → All Contributions; 902c → Elective Deferrals/SH; 902d → Matching; 902e → Nonelective Profit Sharing)

Volume Submitter 401(k) Profit Sharing Plan j. Other: _____ 1. [ ]   OR   2. [ ]   3. [ ]   4. [ ]
   (must be definitely determinable, may not be based on age
   or length of service (except in a manner consistent with i.
   above) or level of Compensation, and, if using the average
   benefits test to satisfy Code §410(b) coverage testing,
   must be a reasonable classification)

k. [ ] Other: _____ (must (1) specify contributions to which exclusions apply, (2) be definitely
   determinable and not based on age or length of service (except in a manner consistent with i. above) or level of
   Compensation, and, (3) if using the average benefits test to satisfy Code §410(b) coverage testing, be a reasonable
   classification).

14. CONDITIONS OF ELIGIBILITY (Plan Section 3.1)
    a. [ ] No age or service required. No age or service required for all contribution types (skip to Question 15).
    b. [X] Eligibility - same for all contribution types. An Eligible Employee will be eligible to participate in the Plan for all
       contribution types upon satisfaction of the following (select one or more of c. - n. below; also select 1. (All
       Contributions) for each condition selected at c. - m.):
    c. [ ] Eligibility - different conditions apply. An Eligible Employee will be eligible to participate in the Plan upon
       satisfaction of the following either for all contribution types or to the designated contribution type (select one or more
       of d. - n. below; also select 1. OR all that apply of 2. - 4. for each condition selected at d. - m.):

NOTE: Unless otherwise specified in this Section, Elective Deferrals include Roth Elective Deferrals, after-tax voluntary
    Employee contributions, and rollover contributions (unless otherwise selected at Question 46); Matching includes
    QMACs; and Nonelective Profit Sharing includes QNECs. "ADP test safe harbor contributions" (SH) (including
    those made pursuant to a QACA SAFE 401(k) contributions are subject to the conditions for Elective
    Deferrals except as provided in

| Eligibility Conditions | All Contributions | | Elective Deferrals/SH | Matching | Nonelective Profit Sharing |
|---|---|---|---|---|---|
| No age or service required | N/A | | 2. [ ] | 3. [ ] | 4. [ ] |
| Age 20 1/2 | 1. [ ] | OR | 2. [ ] | 3. [ ] | 4. [ ] |
| Age 21 | 1. [ ] | OR | 2. [ ] | 3. [ ] | 4. [ ] |
| Age 18 (may not exceed 21) | 1. [X] | OR | 2. [ ] | 3. [ ] | 4. [ ] |
| ___ (not to exceed 12) months of service (elapsed time) | 1. [ ] | OR | 2. [ ] | 3. [ ] | 4. [ ] |
| 1 Year of Service | 1. [ ] | OR | 2. [ ] | 3. [ ] | 4. [ ] |
| 2 Years of Service | N/A | OR | N/A | 3. [ ] | 4. [ ] |
| ___ (not to exceed 12) consecutive month period from the Eligible Employee's employment commencement date during which ___ (not to exceed 1,000) Hours of Service are completed (If an Employee does not complete the stated Hours of Service during the specified time period, the Employee is subject to the 1 Year of Service requirement in f. above) | 1. [ ] | OR | 2. [ ] | 3. [ ] | 4. [ ] |
| ___ (not to exceed 12 consecutive months of employment from the Eligible Employee's employment commencement date. (If an Employee does not complete the stated number of months, the Employee is subject to the 1 Year of Service requirement in f. above) | 1. [ ] | OR | 2. [ ] | 3. [ ] | 4. [ ] |
| Other: 90 days of commencement of employment | 1. [X] | OR | 2. [ ] | 3. [ ] | 4. [ ] |
| (e.g., date on which 1,000 Hours of Service is completed within the computation period) (must satisfy the Notes below) | | | | | |
| [ ] Other: _____ (e.g., date on which 1,000 Hours of Service is completed within the computation period) (must specify contributions to which conditions apply and satisfy the Notes below) | | | | | |

NOTE: If m. or n. is selected, the condition must be an age or service requirement that is definitely determinable and may not
exceed age 21 and for Elective Deferrals, 1 Year of Service, for Employer matching and/or Nonelective profit sharing
contributions, may not exceed 2 Years of Service. If more than 1 Year of Service is required for Employer matching
and/or Nonelective profit sharing contributions, 100% immediate vesting is required.

© 2014 Nationwide Financial Services, Inc. or its suppliers

FIG. 10A

Volume Submitter 401(k) Profit Sharing Plan j. Other: _____ 1.[ ]   OR   2.[ ]   3.[ ]   4.[ ]
   (must be definitely determinable, may not be based on age
   or length of service (except in a manner consistent with i.
   above) or level of Compensation, and, if using the average
   benefits test to satisfy Code §410(b) coverage testing,
   must be a reasonable classification)

k. [ ] Other: _____ (must (1) specify contributions to which exclusions apply, (2) be definitely
   determinable and not based on age or length of service (except in a manner consistent with i. above) or level of
   Compensation, and, (3) if using the average benefits test to satisfy Code §410(b) coverage testing, be a reasonable
   classification).

14. CONDITIONS OF ELIGIBILITY (Plan Section 3.1)
    a. [ ] No age or service required. No age or service required for all contribution types (skip to Question 15).
    b. [X] Eligibility - same for all contribution types. An Eligible Employee will be eligible to participate in the Plan for all
       contribution types upon satisfaction of the following (select one or more of e. - n. below; also select 1. (All
       Contributions) for each condition selected at e. - m.):
    c. [ ] Eligibility - different conditions apply. An Eligible Employee will be eligible to participate in the Plan upon
       satisfaction of the following either for all contribution types or to the designated contribution type (select one or more
       of d. - n. below; also select 1. OR all that apply of 2. - 4. for each condition selected at d. - m.):

NOTE: Unless otherwise specified in this Section, Elective Deferrals include Roth Elective Deferrals, after-tax voluntary
    Employee contributions, and rollover contributions (unless otherwise selected at Question 46); Matching includes
    QMACs; and Nonelective Profit Sharing includes QNECs. "ADP test safe harbor contributions" (SH) (including
    those made pursuant to a QACA) and SIMPLE 401(k) contributions are subject to the conditions for Elective
    Deferrals except as provided in Question 27.

| Eligibility Conditions | All Contributions | | Elective Deferrals/SH | Matching | Nonelective Profit Sharing |
|---|---|---|---|---|---|
| d. No age or service required | [X] | | 2.[ ] | 3.[ ] | 4.[ ] |
| e. Age 20 1/2 | [ ] | OR | 2.[ ] | 3.[ ] | 4.[ ] |
| f. Age 21 | [ ] | OR | 2.[ ] | 3.[ ] | 4.[ ] |
| g. Age _18_ (may not exceed 21) | [X] | OR | 2.[ ] | 3.[ ] | 4.[ ] |
| h. _____ (not to exceed 12) months of service (elapsed time) | [ ] | OR | 2.[ ] | 3.[ ] | 4.[ ] |
| i. 1 Year of Service | [ ] | OR | 2.[ ] | 3.[ ] | 4.[ ] |
| j. 2 Years of Service | [X] | OR | N/A | 3.[ ] | 4.[ ] |
| k. _____ (not to exceed 12) consecutive month period from the Eligible Employee's employment commencement date and during which at least _____ (not to exceed 1,000) Hours of Service are completed. If an Employee does not complete the stated Hours of Service during the specified time period, the Employee is subject to the 1 Year of Service requirement in i. above. | [ ] | OR | 2.[ ] | 3.[ ] | 4.[ ] |
| l. _____ (not to exceed 12) consecutive months of employment from the Eligible Employee's employment commencement date. If an Employee does not complete the stated number of months, the Employee is subject to the 1 Year of Service requirement in i. above. | [ ] | OR | 2.[ ] | 3.[ ] | 4.[ ] |
| m. Other: _90 days of consecutive employment_ (e.g., date on which 1,000 Hours of Service is completed within the computation period) (must satisfy the Notes below) | [X] | OR | 2.[ ] | 3.[ ] | 4.[ ] |
| n. [ ] Other: _(e.g., date on which 1,000 Hours of Service is completed within the computation period)_ (must specify contributions to which conditions apply and satisfy the Notes below) | | | | | |

*Table* — 1002b

NOTE: If m. or n. is selected, the condition must be an age or service requirement that is definitely determinable and may not
exceed age 21 and for Elective Deferrals, 1 Year of Service; for Employer matching and/or Nonelective profit sharing
contributions, may not exceed 2 Years of Service. If more than 1 Year of Service is required for Employer matching
and/or Nonelective profit sharing contributions, 100% immediate vesting is required.

© 2014 Nationwide Financial Services, Inc. or its suppliers

FIG. 10B

Volume Submitter 401(k) Profit Sharing Plan j. Other: _____ 1.[ ]   OR   2.[ ]   3.[ ]   4.[ ]
   (must be definitely determinable, may not be based on age
   or length of service (except in a manner consistent with i.
   above) or level of Compensation, and, if using the average
   benefits test to satisfy Code §410(b) coverage testing,
   must be a reasonable classification)

k. [ ] Other: _____ (must (1) specify contributions to which exclusions apply, (2) be definitely
   determinable and not based on age or length of service (except in a manner consistent with i. above) or level of
   Compensation, and, (3) if using the average benefits test to satisfy Code §410(b) coverage testing, be a reasonable
   classification).

14. CONDITIONS OF ELIGIBILITY (Plan Section 3.1)
   a. [ ] No age or service required. No age or service required for all contribution types (skip to Question 15).
   b. [X] Eligibility - same for all contribution types. An Eligible Employee will be eligible to participate in the Plan for all
      contribution types upon satisfaction of the following (select one or more of e. - n. below; also select 1. (All
      Contributions) for each condition selected at e. - m.):
   c. [ ] Eligibility - different conditions apply. An Eligible Employee will be eligible to participate in the Plan upon
      satisfaction of the following either for all contribution types or to the designated contribution type (select one or more
      of d. - n. below; also select 1. OR all that apply of 2. - 4. for each condition selected at d. - m.):

NOTE: Unless otherwise specified in this Section, Elective Deferrals include Roth Elective Deferrals, after-tax voluntary
   Employee contributions, and rollover contributions (unless otherwise selected at Question 46); Matching includes
   QMACs; and Nonelective Profit Sharing includes QNECs. "ADP test safe harbor contributions" (SH) (including
   those made pursuant to a QACA) and SIMPLE 401(k) contributions are subject to the conditions for Elective
   Deferrals except as provided in Question 27.

| Eligibility Conditions | All Contributions | | Elective Deferrals/SH | Matching | Nonelective Profit Sharing |
|---|---|---|---|---|---|
| d. No age or service required | N/A | | 2.[ ] | 3.[ ] | 4.[ ] |
| e. Age 20 1/2 | 1.[ ] | OR | 2.[ ] | 3.[ ] | 4.[ ] |
| f. Age 21 | 1.[ ] | OR | 2.[ ] | 3.[ ] | 4.[ ] |
| g. Age _18_ (may not exceed 21) | 1.[X] | OR | 2.[ ] | 3.[ ] | 4.[ ] |
| h. _____ (not to exceed 12) months of service (elapsed time) | 1.[ ] | OR | 2.[ ] | 3.[ ] | 4.[ ] |
| i. 1 Year of Service | 1.[ ] | OR | 2.[ ] | 3.[ ] | 4.[ ] |
| j. 2 Years of Service | N/A | OR | 2.[ ] | 3.[ ] | 4.[ ] |
| k. _____ (not to exceed 12) consecutive month period from the Eligible Employee's employment commencement date and during which at least _____ (not to exceed 1,000) Hours of Service are completed. If an Employee does not complete the stated Hours of Service during the specified time period, the Employee is subject to the 1 Year of Service requirement in i. above. | 1.[ ] | OR | 2.[ ] | 3.[ ] | 4.[ ] |
| l. _____ (not to exceed 12) consecutive months of employment from the Eligible Employee's employment commencement date. If an Employee does not complete the stated number of months, the Employee is subject to the 1 Year of Service requirement in i. above. | 1.[ ] | OR | 2.[ ] | 3.[ ] | 4.[ ] |
| m. Other: _90 days of consecutive employment_ (e.g., date on which 1,000 Hours of Service is completed within the computation period) (must satisfy the Notes below) | 1.[X] | OR | 2.[ ] | 3.[ ] | 4.[ ] |

Table ↑ 1002c n. [ ] Other: _____ (e.g., date on which 1,000 Hours of Service is completed within the
   computation period) (must specify contributions to which conditions apply and satisfy the Notes below)

NOTE: If m. or n. is selected, the condition must be an age or service requirement that is definitely determinable and may not
   exceed age 21 and for Elective Deferrals, 1 Year of Service; for Employer matching and/or Nonelective profit sharing
   contributions, may not exceed 2 Years of Service. If more than 1 Year of Service is required for Employer matching
   and/or Nonelective profit sharing contributions, 100% immediate vesting is required.

© 2014 Nationwide Financial Services, Inc. or its suppliers

FIG. 10C

Volume Submitter 401(k) Profit Sharing Plan j. Other: _____ 1.[ ]  OR  2.[ ]  3.[ ]  4.[ ]
(must be definitely determinable, may not be based on age
or length of service (except in a manner consistent with i.
above) or level of Compensation, and, if using the average
benefits test to satisfy Code §410(b) coverage testing,
must be a reasonable classification)

k. [ ] Other: _____ (must (1) specify contributions to which exclusions apply, (2) be definitely determinable and not based on age or length of service (except in a manner consistent with i. above) or level of Compensation, and, (3) if using the average benefits test to satisfy Code §410(b) coverage testing, be a reasonable classification).

14. CONDITIONS OF ELIGIBILITY (Plan Section 3.1)
   a. [ ] No age or service required. No age or service required for all contribution types (skip to Question 15).
   b. [X] Eligibility - same for all contribution types. An Eligible Employee will be eligible to participate in the Plan for all contribution types upon satisfaction of the following (select one or more of e. - n. below; also select 1. (All Contributions) for each condition selected at e. - m.):
   c. [ ] Eligibility - different conditions apply. An Eligible Employee will be eligible to participate in the Plan upon satisfaction of the following either for all contribution types or to the designated contribution type (select one or more of d. - n. below; also select 1. OR all that apply of 2. - 4. for each condition selected at d. - m.):

NOTE: Unless otherwise specified in this Section, Elective Deferrals include Roth Elective Deferrals, after-tax voluntary Employee contributions, and rollover contributions (unless otherwise selected at Question 46); Matching includes QMACs; and Nonelective Profit Sharing includes QNECs. "ADP test safe harbor contributions" (SH) (including those made pursuant to a QACA) and SIMPLE 401(k) contributions are subject to the conditions for Elective Deferrals except as provided in Question 27.

Table:

| Eligibility Conditions | All Contributions | Elective Deferrals/SH | Matching | Nonelective Profit Sharing |
|---|---|---|---|---|
| d. No age or service required | N/A | 2.[ ] |  | 4.[ ] |
| e. Age 20 1/2 | 1.[ ] OR | 2.[ ] | ▓▓▓ | 4.[ ] |
| f. Age 21 | 1.[ ] OR | 2.[ ] | ▓▓▓ | 4.[ ] |
| g. Age _18_ (may not exceed 21) | 1.[X] OR | 2.[ ] | ▓▓▓ | 4.[ ] |
| h. ____ (not to exceed 12) months of service (elapsed time) | 1.[ ] OR | 2.[ ] | ▓▓▓ | 4.[ ] |
| i. 1 Year of Service | 1.[ ] OR | 2.[ ] | ▓▓▓ | 4.[ ] |
| j. 2 Years of Service | N/A OR | N/A | ▓▓▓ | 4.[ ] |
| k. ____ (not to exceed 12) consecutive month period from the Eligible Employee's employment commencement date and during which at least ____ (not to exceed 1,000) Hours of Service are completed. If an Employee does not complete the stated Hours of Service during the specified time period, the Employee is subject to the 1 Year of Service requirement in i. above. | 1.[ ] OR | 2.[ ] | ▓▓▓ | 4.[ ] |
| l. ____ (not to exceed 12) consecutive months of employment from the Eligible Employee's employment commencement date. If an Employee does not complete the stated number of months, the Employee is subject to the 1 Year of Service requirement in i. above. | 1.[ ] OR | 2.[ ] | ▓▓▓ | 4.[ ] |
| m. Other: _90 days of consecutive employment_ (e.g., date on which 1,000 Hours of Service is completed within the computation period) (must satisfy the Notes below) | 1.[X] OR | 2.[ ] | ▓▓▓ | 4.[ ] |

The Matching column is indicated as 1002d.

n. [ ] Other: _____ (e.g., date on which 1,000 Hours of Service is completed within the computation period) (must specify contributions to which conditions apply and satisfy the Notes below)

NOTE: If m. or n. is selected, the condition must be an age or service requirement that is definitely determinable and may not exceed age 21 and for Elective Deferrals, 1 Year of Service; for Employer matching and/or Nonelective profit sharing contributions, may not exceed 2 Years of Service. If more than 1 Year of Service is required for Employer matching and/or Nonelective profit sharing contributions, 100% immediate vesting is required.

© 2014 Nationwide Financial Services, Inc. or its suppliers

FIG. 10D

Volume Submitter 401(k) Profit Sharing Plan j. Other: _____ 1. [ ] OR 2. [ ] 3. [ ] 4. [ ]
(must be definitely determinable, may not be based on age or length of service (except in a manner consistent with i. above) or level of Compensation, and, if using the average benefits test to satisfy Code §410(b) coverage testing, must be a reasonable classification)

k. [ ] Other: _____ (must (1) specify contributions to which exclusions apply, (2) be definitely determinable and not based on age or length of service (except in a manner consistent with i. above) or level of Compensation, and, (3) if using the average benefits test to satisfy Code §410(b) coverage testing, be a reasonable classification).

14. CONDITIONS OF ELIGIBILITY (Plan Section 3.1)
    a. [ ] No age or service required. No age or service required for all contribution types (skip to Question 15).
    b. [X] Eligibility - same for all contribution types. An Eligible Employee will be eligible to participate in the Plan for all contribution types upon satisfaction of the following (select one or more of e. - n. below; also select 1. (All Contributions) for each condition selected at e. - m.):
    c. [ ] Eligibility - different conditions apply. An Eligible Employee will be eligible to participate in the Plan upon satisfaction of the following either for all contribution types or to the designated contribution type (select one or more of d. - n. below; also select 1. OR all that apply of 2. - 4. for each condition selected at d. - m.).
    NOTE: Unless otherwise specified in this Section, Elective Deferrals include Roth Elective Deferrals, after-tax voluntary Employee contributions, and rollover contributions (unless otherwise selected at Question 46); Matching includes QMACs; and Nonelective Profit Sharing includes QNECs. "ADP test safe harbor contributions" (SH) (including those made pursuant to a QACA and SIMPLE 401(k) contributions are subject to the conditions for Elective Deferrals except as provided in Question 27.

| Eligibility Conditions | All Contributions | | Elective Deferrals/SH | Matching | Nonelective Profit Sharing |
|---|---|---|---|---|---|
| d. No age or service required | N/A | | 2. [ ] | 3. [ ] | 4. [ ] |
| e. Age 20 1/2 | 1. [ ] | OR | 2. [ ] | 3. [ ] | 4. [ ] |
| f. Age 21 | 1. [ ] | OR | 2. [ ] | 3. [ ] | 4. [ ] |
| g. Age _18_ (may not exceed 21) | 1. [X] | OR | 2. [ ] | 3. [ ] | 4. [ ] |
| h. ___ (not to exceed 12) months of service (elapsed time) | 1. [ ] | OR | 2. [ ] | 3. [ ] | 4. [ ] |
| i. 1 Year of Service | 1. [ ] | OR | 2. [ ] | 3. [ ] | 4. [ ] |
| j. 2 Years of Service | N/A | OR | N/A | 3. [ ] | 4. [ ] |
| k. ___ (not to exceed 12) consecutive month period from the Eligible Employee's employment commencement date and during which at least ___ (not to exceed 1,000) Hours of Service are completed. If an Employee does not complete the stated Hours of Service during the specified time period, the Employee is subject to the 1 Year of Service requirement in i. above. | 1. [ ] | OR | 2. [ ] | 3. [ ] | 4. [ ] |
| l. ___ (not to exceed 12) consecutive months of employment from the Eligible Employee's employment commencement date. If an Employee does not complete the stated number of months, the Employee is subject to the 1 Year of Service requirement in i. above. | 1. [ ] | OR | 2. [ ] | 3. [ ] | 4. [ ] |
| m. Other: _90 days of consecutive employment_ (e.g., date on which 1,000 Hours of Service is completed within the computation period) (must satisfy the Notes below) | 1. [X] | OR | 2. [ ] | 3. [ ] | 4. [ ] |

(Table)

The Nonelective Profit Sharing column is indicated as 1002e.

n. [ ] Other: _____ (e.g., date on which 1,000 Hours of Service is completed within the computation period) (must specify contributions to which conditions apply and satisfy the Notes below)

NOTE: If m. or n. is selected, the condition must be an age or service requirement that is definitely determinable and may not exceed age 21 and for Elective Deferrals, 1 Year of Service; for Employer matching and/or Nonelective profit sharing contributions, may not exceed 2 Years of Service. If more than 1 Year of Service is required for Employer matching and/or Nonelective profit sharing contributions, 100% immediate vesting is required.

© 2014 Nationwide Financial Services, Inc. or its suppliers

Volume Submitter 401(k) Profit Sharing Plan j. Other: _____ 1. [ ] OR 2. [ ] 3. [ ] 4. [ ]
(must be definitely determinable, may not be based on age
or length of service (except in a manner consistent with i.
above) or level of Compensation, and, if using the average
benefits test to satisfy Code §410(b) coverage testing,
must be a reasonable classification)

k. [ ] Other: _____ (must (1) specify contributions to which exclusions apply, (2) be definitely
determinable and not based on age or length of service (except in a manner consistent with i. above) or level of
Compensation, and, (3) if using the average benefits test to satisfy Code §410(b) coverage testing, be a reasonable
classification).

14. CONDITIONS OF ELIGIBILITY (Plan Section 3.1)
a. [ ] No age or service required. No age or service required for all contribution types (skip to Question 15).
b. [X] Eligibility - same for all contribution types. An Eligible Employee will be eligible to participate in the Plan for all
contribution types upon satisfaction of the following (select one or more of e. - n. below; also select 1. (All
Contributions) for each condition selected at e. - m.):
c. [ ] Eligibility - different conditions apply. An Eligible Employee will be eligible to participate in the Plan upon
satisfaction of the following either for all contribution types or to the designated contribution type (select one or more
of d. - n. below; also select 1. OR all that apply of 2. - 4. for each condition selected at d. - m.):

NOTE: Unless otherwise specified in this Section, Elective Deferrals include Roth Elective Deferrals, after-tax voluntary
Employee contributions, and rollover contributions (unless otherwise selected at Question 46); Matching includes
QMACs; and Nonelective Profit Sharing includes QNECs. "_____ safe harbor contributions" (SH) (including
those made pursuant to a QACA) and SIMPLE 401(k) contributions are subject to the conditions for Elective
Deferrals except as provided in Question 27.

| Eligibility Conditions | All Contributions | Elective Deferrals/SH | Matching | Nonelective Profit Sharing |
|---|---|---|---|---|
| d. No age or service required | N/A | 2. [ ] | 3. [ ] | 4. [ ] |
| e. Age 20 1/2 | 1. [ ] | OR 2. [ ] | 3. [ ] | 4. [ ] |
| f. Age 21 | 1. [ ] | OR 2. [ ] | 3. [ ] | 4. [ ] |
| g. Age _18_ (may not exceed 21) | 1. [X] | OR 2. [ ] | 3. [ ] | 4. [ ] |
| h. _____ (not to exceed 12) months of service (elapsed time) | 1. [ ] | OR 2. [ ] | 3. [ ] | 4. [ ] |
| i. 1 Year of Service | 1. [ ] | OR 2. [ ] | 3. [ ] | 4. [ ] |
| j. 2 Years of Service | N/A | OR N/A | 3. [ ] | 4. [ ] |
| k. _____ (not to exceed 12) consecutive month period from the Eligible Employee's employment commencement date and during which at least _____ (not to exceed 1,000) Hours of Service are completed. If an Employee does not complete the stated Hours of Service during the specified time period, the Employee is subject to the 1 Year of Service requirement in i. above. | 1. [ ] | OR 2. [ ] | 3. [ ] | 4. [ ] |
| l. _____ (not to exceed 12) consecutive months of employment from the Eligible Employee's employment commencement date. If an Employee does not complete the stated number of months, the Employee is subject to the 1 Year of Service requirement in i. above. | 1. [ ] | OR 2. [ ] | 3. [ ] | 4. [ ] |
| m. Other: _90 days of consecutive employment_ (e.g., date on which 1,000 Hours of Service is completed within the computation period) (must satisfy the Notes below) | 1. [X] | OR 2. [ ] | 3. [ ] | 4. [ ] | n. [ ] Other: _____ (e.g., date on which 1,000 Hours of Service is completed within the
computation period) (must specify contributions to which conditions apply and satisfy the Notes below)

NOTE: If m. or n. is selected, the condition must be an age or service requirement that is definitely determinable and may not
exceed age 21 and for Elective Deferrals, 1 Year of Service; for Employer matching and/or Nonelective profit sharing
contributions, may not exceed 2 Years of Service. If more than 1 Year of Service is required for Employer matching
and/or Nonelective profit sharing contributions, 100% immediate vesting is required.

© 2014 Nationwide Financial Services, Inc. or its suppliers

FIG. 11

SYSTEMS AND METHODS FOR DETECTION AND EXTRACTION OF BORDERLESS CHECKBOX TABLES

TECHNICAL FIELD

This application relates generally to systems and methods for extracting data from electronic documents, including systems and methods for extracting borderless checkbox tables from electronic documents.

BACKGROUND

Many organizations rely upon electronic documents to provide information to, and obtain information from, customers and other parties. These electronic documents can often be quite dense and complex, particularly in industries that are highly regulated by government. An exemplary document could be a retirement plan document, such as adoption agreements and/or 401(k) profit sharing plan that are required to be filed with the SEC. Such documents generally include complex structures, such as borderless tables with checkboxes, which contain important information for the organization to capture and ingest.

In some cases, organizations attempt to use software and computing systems to perform automated ingestion of such digital documents. However, due to the complexity of the document text and structure, such automated systems (using off-the-shelf techniques such as optical character recognition (OCR)) either cannot capture the desired information correctly or capture only a portion of the desired information. In other cases, the automated system must be configured with a template that specifically identifies the exact location(s) of tables, checkboxes, and the like for the software to parse and also is pre-loaded with semantics, dependencies, and other metadata of the table—which increases the burden on programmers and system administrators to manually create and implement such templates.

In either case, automated systems still capture irrelevant or incorrect information which degrades the quality and accuracy of data collected from the electronic documents as maintained by the organization. In addition, there is typically more rework required (e.g., checking, re-checking) of the results of such automated systems due to the lack of consistency and accuracy—which delays the acquisition of a results set. Also, computing systems that implement more traditional reading comprehension or natural language processing (NLP) algorithms to understand document context cannot overcome the unique challenges presented by borderless checkbox tables in electronic documents due to the complex structure of such data.

For example, existing borderless table detection systems fail to handle complexities in terms of detecting and extracting borderless tables. As can be appreciated, existing systems rely on identifying the table grid using visual cues. However, certain borderless tables do not have a clear visual boundary or grid due to column overflow, multi-line headers and rows, and multi-page tables. Because such tables have, e.g., fuzzy column margins where text in one column overflows into another column, table headers and rows span multiple lines and the table itself spans across multiple pages, existing systems cannot accurately process them using only visual cues. In addition, existing systems do not have a way to associate checkboxes to their corresponding columns and identify dependencies between columns that are specified as logical operators.

SUMMARY

Accordingly, an object of the invention is to provide systems and methods for extracting borderless checkbox tables from electronic documents for generation of queryable data structures in computing systems. It is an object of the invention to provide systems and methods for detecting checkboxes corresponding to borderless checkbox tables of a textual electronic document. It is an object of the invention to provide systems and methods for extracting text blocks corresponding to borderless checkbox tables of a textual electronic document. It is an object of the invention to provide systems and methods for determining table boundaries corresponding to borderless checkbox tables of a textual electronic document. It is an object of the invention to provide systems and methods for identifying table headers, rows, columns, and cells corresponding to borderless checkbox tables of a textual electronic document. It is an object of the invention to provide systems and methods for generating a data structure including data representing borderless checkbox tables of a textual electronic document.

The invention, in one aspect, features, a computerized method of extracting borderless checkbox tables from electronics documents. A server computing device detects a plurality of checkboxes in a textual electronic document. The server computing device extracts a plurality of text blocks from the textual electronic document. The server computing device identifies one or more table headers corresponding to at least one borderless checkbox table in the textual electronic document based on the text blocks. The server computing device determines a table boundary corresponding to the at least one borderless checkbox table based on the table headers. The server computing device identifies a plurality of table rows and a plurality of table columns corresponding to the at least one borderless checkbox table based on the table boundary and the plurality of checkboxes. The server computing device identifies a plurality of table cells corresponding to the at least one borderless checkbox table based on the plurality of table rows and the plurality of table columns. The server computing device generates a data structure comprising data representing the at least one borderless checkbox table based on at least the plurality of table cells and the plurality of checkboxes.

The invention, in another aspect, features a computer system for extracting borderless checkbox tables from electronics documents. The system includes a server computing device communicatively coupled to a user device and a database over a network. The server computing device comprises a memory for storing computer-executable instructions and a processor that executes the computer-executable instructions. The server computing device detects a plurality of checkboxes in a textual electronic document. The server computing device extracts a plurality of text blocks from the textual electronic document. The server computing device identifies one or more table headers corresponding to at least one borderless checkbox table in the textual electronic document based on the text blocks. The server computing device determines a table boundary corresponding to the at least one borderless checkbox table based on the table headers. The server computing device identifies a plurality of table rows and a plurality of table columns corresponding to the at least one borderless checkbox table based on the table boundary and the plurality of checkboxes. The server computing device identifies a plurality of table cells corresponding to the at least one borderless checkbox table based on the plurality of table rows and the plurality of table columns. The server computing device generates a data structure comprising data representing the at least one borderless checkbox table based on at least the plurality of table cells and the plurality of checkboxes.

Any of the above aspects can include one or more of the following features. In some embodiments, the server computing device processes an image-based electronic document into the textual electronic document using optical character recognition. In some embodiments, the server computing device determines a plurality of page header coordinates corresponding to a plurality of page headers of the textual electronic document and a plurality of page footer coordinates corresponding to a plurality of page footers of the textual electronic document. In some embodiments, the server computing device determines a plurality of bullet coordinates, each bullet coordinate corresponding to a bullet of a line of the textual electronic document. In some embodiments, the server computing device determines the table boundary based on at least the plurality of coordinates corresponding to the plurality of checkboxes and the plurality of bullet coordinates.

In some embodiments, the server computing device determines a plurality of indentation levels, each indentation level corresponding to an indentation of a line of the textual electronic document. In some embodiments, the server computing device determines the table boundary based on at least the plurality of coordinates corresponding to the plurality of checkboxes and the plurality of indentation levels. In some embodiments, the server computing device merges a plurality of identified table headers of the plurality of table headers corresponding to a plurality of consecutive lines. In some embodiments, the server computing device detects the plurality of checkboxes using a Hough transformer. In some embodiments, each of the plurality of text blocks is separated by a pattern of whitespace.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of an exemplary page of a textual electronic document that shows checkboxes of a borderless checkbox table detected by server computing device.

FIG. 5 is a diagram of an exemplary page of a textual electronic document that shows text blocks of a borderless checkbox table detected by server computing device.

FIG. 6 is a diagram of an exemplary page of a textual electronic document that shows a table header of a borderless checkbox table detected by server computing device.

FIG. 7 is a diagram of an exemplary page of a textual electronic document that shows a table header and table end line of a borderless checkbox table detected by server computing device.

FIG. 8 is a diagram of an exemplary page of a textual electronic document that shows table rows of a borderless checkbox table detected by server computing device based upon the table header and table end line.

FIG. 9 is a diagram of an exemplary page of a textual electronic document that shows table column headers of a borderless checkbox table detected by server computing device.

FIGS. 10A-10E are diagrams of an exemplary page of a textual electronic document that shows table cells of a borderless checkbox table detected by server computing device for each column and row of the table.

FIG. 11 is a diagram of an exemplary page of a textual electronic document that shows table cells of a borderless checkbox table detected by server computing device that do not overlap with any of the column headers.

DETAILED DESCRIPTION

Figure 1:
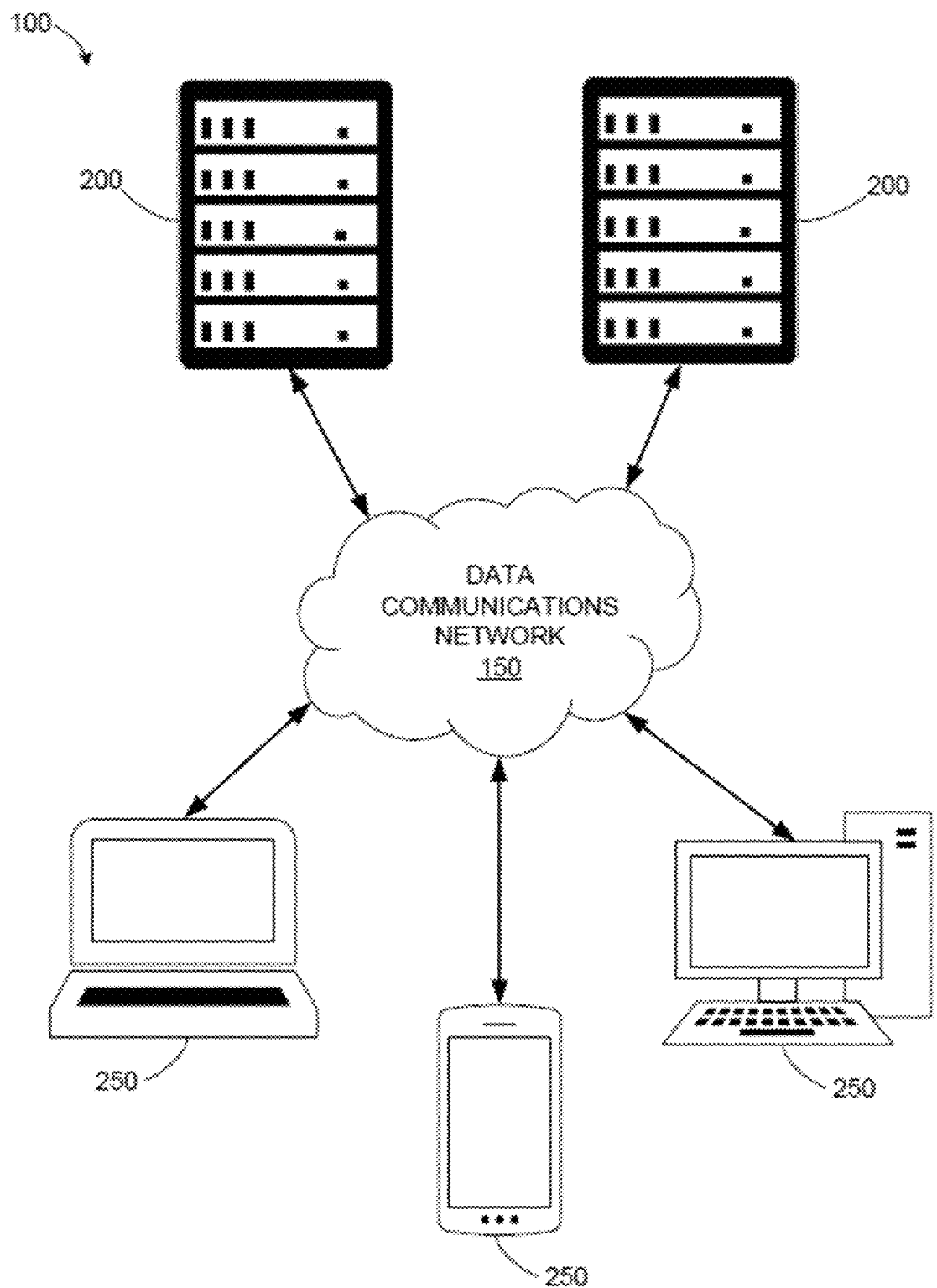
FIG. 1 is a block diagram of an exemplary data communications network, according to embodiments of the technology described herein.

In some aspects, the systems and methods described herein can include one or more mechanisms or methods for extracting borderless checkbox tables from electronic documents. For example, the systems and methods described herein can include mechanisms or methods for detecting checkboxes corresponding to borderless checkbox tables of a textual electronic document. The systems and methods described herein can include mechanisms or methods for extracting text blocks corresponding to borderless checkbox tables of a textual electronic document. The systems and methods described herein can include mechanisms or methods for determining table boundaries corresponding to borderless checkbox tables of a textual electronic document. The systems and methods described herein can include mechanisms or methods for identifying table headers, rows, columns, and cells corresponding to borderless checkbox tables of a textual electronic document. The systems and methods described herein can include mechanisms or methods for generating a data structure including data representing borderless checkbox tables of a textual electronic document.

The systems and methods described herein can be implemented using a data communication network, server computing devices, and mobile devices. For example, referring to FIGS. 1 and 2, an exemplary communications system 100 includes data communication network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communication network 150. Communication circuitry 208 and communication circuitry 258 can use Bluetooth™, Wi-Fi™, or any comparable data transfer connection. The user devices 250 can include personal workstations, laptops, tablets, mobile devices, or any other comparable device.

Figure 2:
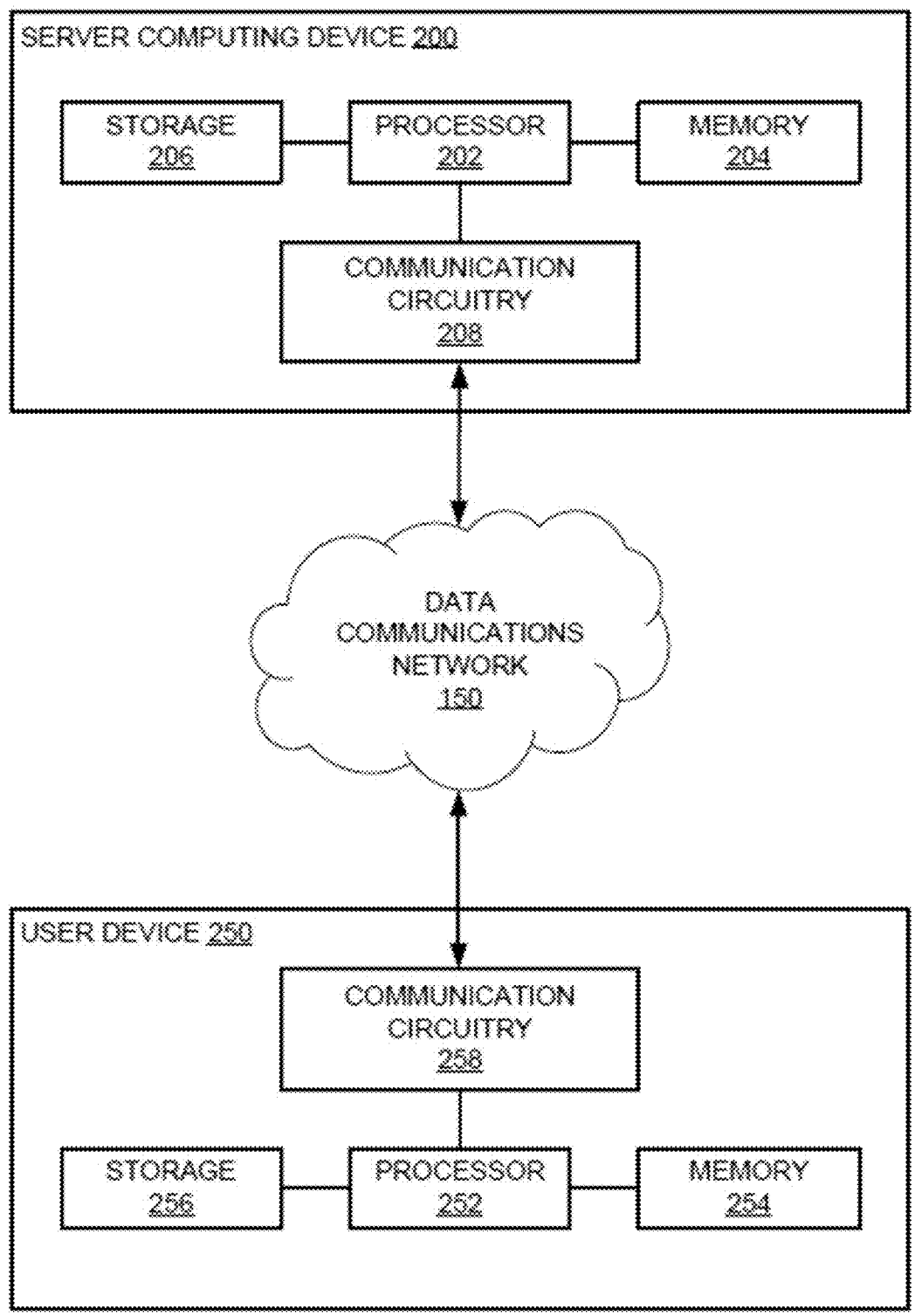
FIG. 2 is a block diagram of an exemplary server computing device and an exemplary user device, according to embodiments of the technology described herein.
Figure 3:
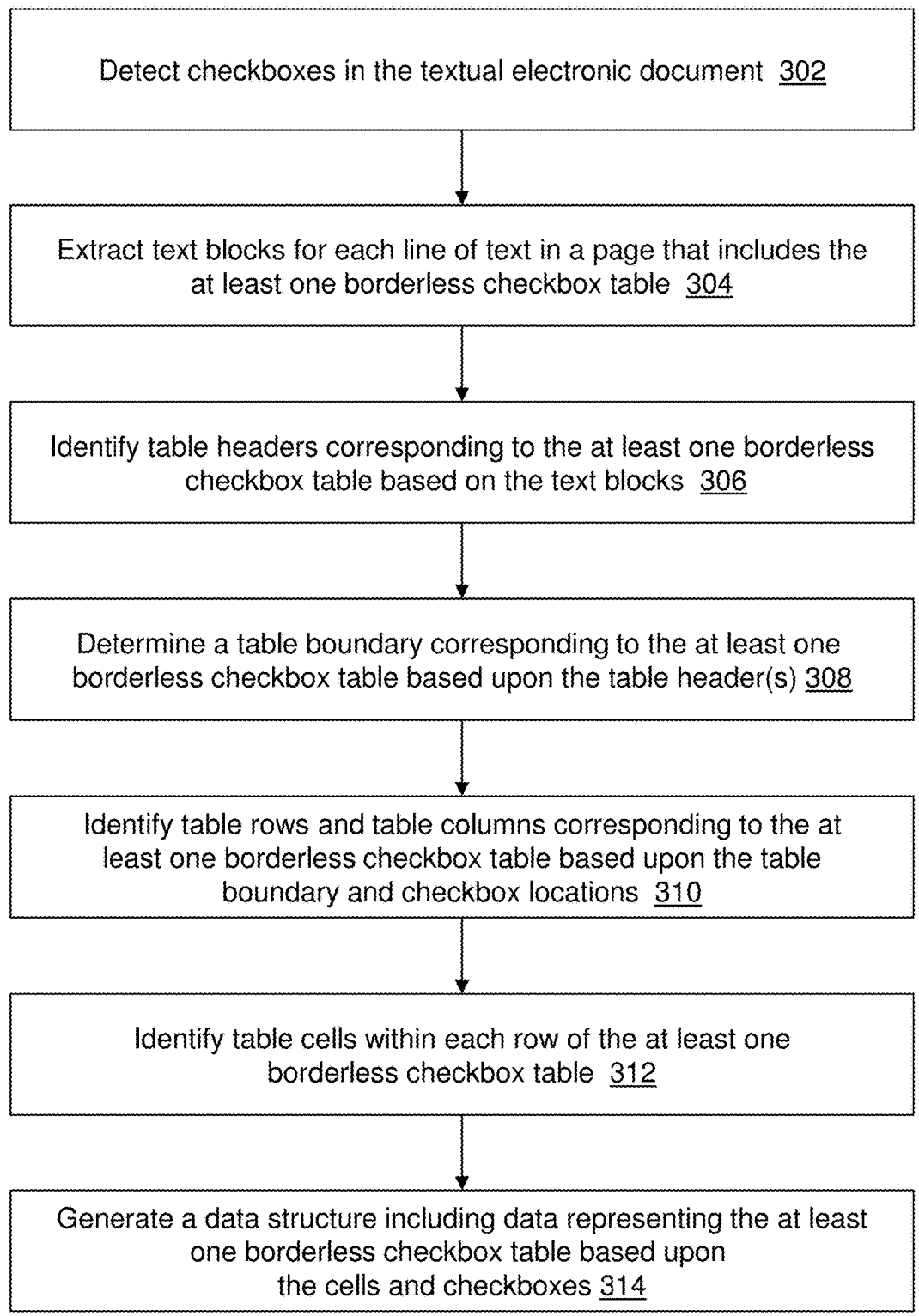
FIG. 3 is a flow diagram of a computer-implemented method for extracting borderless checkbox tables from electronic documents, according to embodiments of the technology described herein.

FIG. 3 is a flow diagram of a computerized method 300 for extracting borderless checkbox tables from electronic documents, using system 100 of FIGS. 1 and 2. Server computing device 200 receives a textual electronic document (e.g., a PDF file). In some embodiments, server computing device 200 retrieves the textual electronic document from, e.g., a data store (such as storage 206). In some embodiments, server computing device 200 receives the textual electronic document from one or more of the client computing devices 250.

In some embodiments, server computing device 200 performs one or more preprocessing steps on the textual electronic document to assist in the process of detecting borderless tables and extracting information from the tables. The preprocessing steps can include identification of header and footer coordinates for the document. For example, server computing device 200 can analyze multiple pages of the document to determine, e.g., whether there is repeating text at the top and/or bottom of each page (which indicates the presence of a header or footer) or white space (i.e., margin areas) at the top and/or bottom of each page. Server computing device 200 determines location coordinates for the header and footer of the document based on the analysis. As can be appreciated, identification of the header and footer coordinates is useful for detecting borderless tables that span multiple pages (and may be intersected by the header/footer).

Another preprocessing step is identification of bullets (also called bullet points) in the beginning of one or more lines. In some embodiments, server computing device 200 utilizes a regular expression pattern-based method to identify bullets—e.g., determining whether the start of a line has an alphanumeric character (1, 2, 3, . . . , a, b, c, . . . , etc.) followed by a period. Detecting bullet points is useful in detecting rows that do not consist of checkboxes.

Another preprocessing step is identification of indentation level of one or more lines. In some embodiments, server computing device 200 utilizes a whitespace pattern-based method to identify indentation of a line—e.g., by measuring an amount of whitespace at the beginning of a line and associating the measured value with an indentation level. Identifying the indentation is useful to detect rows that span across multiple lines.

Server computing device 200 detects (step 302 of FIG. 3) checkboxes in the textual electronic document. For example, in some embodiments, server computing device 200 can detect the checkboxes using a Hough transform algorithm (as described in A. Hassanein et al., "A Survey on Hough Transform, Theory, Techniques and Applications," arXiv: 1502.01260 [cs.CV], 7 Feb. 2015, which is incorporated herein by reference) to extract features from the textual electronic document that correspond or relate to the checkboxes. For example, server computing device 200 can extract certain features (e.g., edges, shapes) that correspond to the checkboxes and then perform one or more morphological operations on the extracted features (e.g., dilation, smoothing, stretching, etc.) to confirm the appearance and location of the checkboxes in the document. In some embodiments, server computing device 200 can execute the above Hough transform algorithm and related operations using an OpenCV image processing library (available at opencv.org). Also in some embodiments, server computing device 200 can execute a regular expression pattern-based checkbox detection algorithm for text-based checkboxes (e.g., implemented using open/closed brackets—[ ]). In some embodiments, server computing device 200 processes an image-based electronic document into the textual electronic document using optical character recognition (OCR) before or after performing one or more of the preprocessing steps described above. FIG. 4 is a diagram of an exemplary page of a textual electronic document that shows checkboxes (in areas 402a, 402b, 402c, 402d) detected by server computing device 200.

Figure 5:
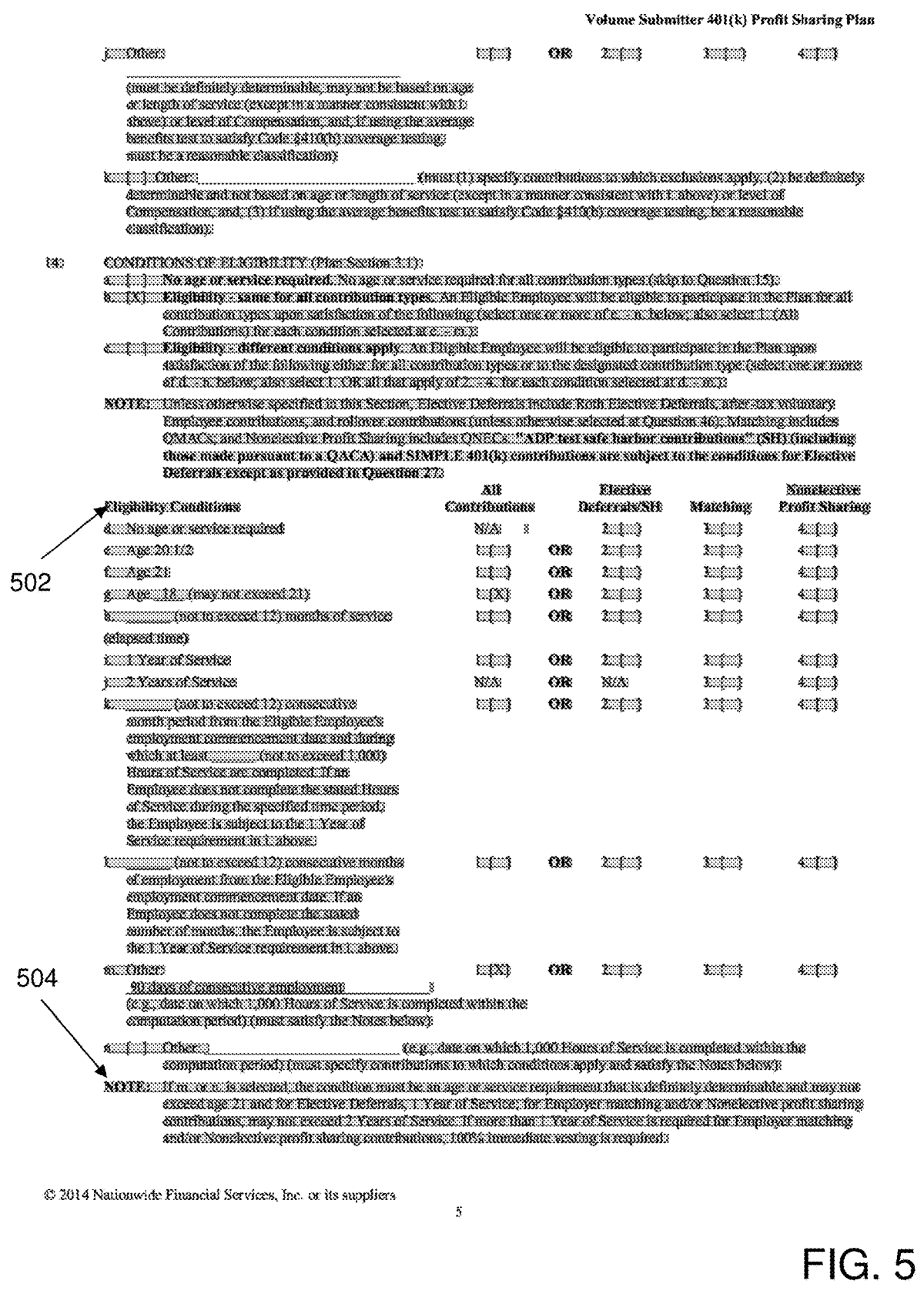

Server computing device 200 then extracts (step 304) text blocks for each line of text in a page of the document that includes the at least one borderless checkbox table, including text blocks that correspond to the at least one borderless checkbox table. As can be appreciated, each line of text on a page of a given document is separated from the previous line of text and the next line of text by a pattern of whitespace. Also, a given line of text may have a plurality of text boxes in the line, each separated by a pattern of whitespace. Server computing device 200 detects one or more text blocks within each line of text using, e.g., a configurable pattern evaluation algorithm and the detected text blocks are the basic units of information for the table detection process described herein. For example, server computing device 200 can determine that a text block comprises a block of text that is separated by at least N pixels of whitespace from another text block. In some embodiments, N equals 10 but it should be appreciated that the value of N can be adjusted according to particular requirements. FIG. 5 is a diagram of an exemplary page of a textual electronic document that shows text blocks (e.g., 502, 504, and others) of a borderless checkbox table detected by server computing device 200.

Server computing device 200 identifies (step 306) table headers corresponding to at least one borderless checkbox table based on the text blocks. Server computing device 200 uses a heuristic approach to identify and filter candidate table headers, by evaluating each line of a document page to determine whether the line corresponds to a table header. In some embodiments, server computing device 200 applies a first set of rules to each line of the page in order to flag the line as a potential candidate header or not. In one example, the first set of rules defining a candidate table header comprises a) the line does not contain any checkboxes; b) the line does not contain bullet points at the beginning of the line; and c) the line has only N=6 or fewer text blocks. As can be appreciated, the value of N in the first set of rules is configurable—changing the value of N can impact the time it takes to perform table detection and extraction by eliminating lines as potential candidate table headers early in the process.

Once a set of candidate table headers is identified as above, server computing device 200 can filter the candidate headers using a second set of rules to identify actual table headers and further eliminate lines that are not headers. In one example, the second set of rules defining an actual table header comprises: the line is followed by at least one line with multiple checkboxes before two consecutive lines with no checkboxes, no bullet points, and in the same or outer indentation level as the first line after the table header.

FIG. 6 is a diagram of an exemplary page of a textual electronic document that shows a table header 602 of a borderless checkbox table detected by server computing device 200. As shown in FIG. 6, the table header 602 is the only line on the page that conforms to the rules defined above, namely: no checkboxes, no bullet points, and fewer than, e.g., N=6 text blocks. Also, the line 604 following the table header 602 has multiple checkboxes.

In some embodiments, server computing device 200 can merge together multiple consecutive lines that are each flagged as a potential candidate table header into a single candidate. As shown in FIG. 6, the table header 602 comprises two consecutive lines that are grouped together.

Server computing device 200 then determines (step 308) a table boundary corresponding to the at least one borderless checkbox table based upon the detected table header. To determine the table boundary, server computing device 200 starts at the line(s) comprising the table header and analyzes each subsequent line using a heuristic approach similar to that used to detect the table header. In one example, server computing device 200 can determine whether a subsequent line has no checkboxes, no bullet points, and in the same or outer indentation level as the first line after the table header. When a subsequent line meets these criteria, server computing device 200 captures location coordinates of the table header line(s) and the table end line (i.e., the line of the page that is immediately preceding the end line). FIG. 7 is a diagram of an exemplary page of a textual electronic document that shows a table header 702 and table end line 704 of a borderless checkbox table detected by server computing device 200.

Server computing device 200 identifies (step 310) table rows and table columns corresponding to the at least one borderless checkbox table based upon the table boundary information, the checkbox location information, and other structural information of the table. In some embodiments, server computing device 200 analyzes each line of the table as defined using the table boundary lines. For each line, server computing device 200 determines that the line is a potential candidate for a new row when a) the line has multiple checkboxes; b) the line has a bullet point that follows bullet points from previous row(s) (e.g., sequentially—1., 2., 3., . . . , a., b., c., . . . ); or c) the line has no bullet point or multiple checkboxes but has the same indentation level as the first row of the table. FIG. 8 is a diagram of an exemplary page of a textual electronic document that shows the table rows (e.g., row 806) of a borderless checkbox table detected by server computing device 200 based upon the table header 802 and table end line 804.

To identify the table columns, server computing device 200 first identifies each column header from the table header as identified previously. Using the table header, server computing device 200 designates each text block in the table header as a column header. When the table header comprises multiple lines, server computing device 200 combines and concatenates the text blocks from the multiple lines together based on overlap in x-coordinates of the text blocks in each line. In some embodiments, once the column headers are designated, server computing device 200 can use the grid of checkboxes within the table boundary to infer the checkbox columns and potential column boundaries within the table. For example, the location coordinates of the left and right sides of the checkboxes can be used as potential column boundaries. Then, if each column header and column boundary have a one-to-one mapping (i.e., based on overlap between x-coordinates), the column headers are confirmed. However, in some cases, a column header can have a one-to-many mapping with checkboxes (e.g., there may be multiple checkboxes in a given column). In these cases, server computing device 200 splits the column header into N headers (where N=number of checkboxes mapped within the column header) by finding the best split points using whitespaces within the header text and the column boundaries from the checkboxes. FIG. 9 is a diagram of an exemplary page of a textual electronic document that shows table column headers 902*a*-902*e* of a borderless checkbox table detected by server computing device 200.

Once the table headers and boundaries are identified, server computing device 200 identifies (step 312) table cells within each row of text as detected previously. In some embodiments, server computing device 200 analyzes each row of the table and determines an overlap between x-coordinates of each text block in the row and each column header in the table. Then, server computing device 200 assigns the text block(s) to a particular column header where the overlap between the x-coordinates is a maximum value. For example, if the x-coordinates for a given text block cover the range of 15 px to 45 px, and the x-coordinates for each column header in a given table are as follows: column one=11-55 px; column two=56-80 px; column three 81-102 px, server computing device 200 will assign the text block to the first column header because x-coordinates for the text block entirely overlap with the x-coordinates for column one. In some instances, a row may contain multiple text blocks that are assigned to the same column header using the technique described above. For each row, text blocks assigned to the same column header are concatenated to form a table cell. For rows where only a single text block is assigned to a particular column header, the text block comprises the table cell. FIGS. 10A-10E are diagrams of an exemplary page of a textual electronic document that shows table cells (including but not limited to cells 1002*a*-1002*e*) of a borderless checkbox table detected by server computing device 200 for each column and row of the table.

As can be seen in FIG. 10A, in some cases a text block may overlap with multiple column headers—the x-coordinates for text block 1004 overlap with the x-coordinates for columns 902*a* and 902*b*. Because a larger portion of the x-coordinates of text block 1004 overlaps with column 902*a* than with column 902*b*, text block 1004 has maximum overlap with column 902*a* and therefore server computing device 200 assigns text block 1004 to column 902*a*.

Also, in certain cases, table cells detected by server computing device 200 may not overlap with any column headers. In these cases, server computing device 200 can generate custom column headers for these columns. FIG. 11 is a diagram of an exemplary page of a textual electronic document that shows table cells 1102 of a borderless checkbox table detected by server computing device 200 that do not overlap with any of the column headers 902*a*-902*e*.

Figure 12:
FIG. 12 is a diagram of an exemplary page of a textual electronic document that shows a table comprising three different segments with text between the segments.

For some documents, a table can be split into multiple tables due to informative text that is interposed in one or more rows of the table. FIG. 12 is a diagram of an exemplary page of a textual electronic document that shows table 1202 comprising three different segments of rows 1202*a*, 1202*b*, 1202*c* with text 1204*a* and 1204*b* in between the segments. When such table splits occur, server computing device 200 performs a further processing routine in order to identify the entire table including all segments. After analyzing table segment 1202*a* as described above, server computing device 200 analyzes the page from the end of first table segment 1202*a* to the header of the next table (not shown). For each line where there are multiple checkboxes that have a one-to-one mapping between each checkbox and each column header in the table header of segment 1202*a*, server computing device 200 considers the line as a potential new table beginning and forms another table with the same header as the first table segment 1202*a*.

Furthermore, headless columns in certain tables can sometimes denote a relationship or dependency between cells in a row. As an example, cells 1102 in FIG. 11 comprise the operator "OR"—indicating that the user should select the checkbox under "All Contributions" or the checkbox under "Elective Deferrals/SH," but not both. Capturing these types of dependences is necessary for server computing device 200 to generate a data structure representing the table that can be meaningfully queried and traversed, and so that the content of the cells can be readily understood by server computing device 200. In these instances, server computing device 200 identifies each column in a table that does not have a column header and flags the column as a dependency column when the content within all cells of the column is text that corresponds to a logical operator (e.g., OR). As can be appreciated, a logical operator can indicate a dependency between checkbox-based cells within a given row. Server computing device 200 uses the dependency information when generating a queryable data structure based upon the table, as described below.

After server computing device 200 has detected the table structure (i.e., rows, columns, boundaries, cells, splits, dependencies, etc.) as described above, server computing device 200 generates (step 314) a data structure including data representing the at least one borderless checkbox table based on at least the associated table cells and associated checkboxes. In some embodiments, server computing device 200 generates a Pandas Dataframe (for use in a Python-based environment) and a queryable data structure object that represents the borderless table. Generally, a Pandas Dataframe comprises a structure that contains two-dimensional data and corresponding labels. In one example, the Pandas Dataframe generated by server computing device 200 includes i) table text—each cell consists of the text within the cell and ii) table checkboxes—each cell consists of the checkboxes within the cell. Additional information about Pandas Dataframes is described in M. Stojilkovic, "The Pandas DataFrame: Make Working with Data Delightful," available at realpython.com/pandas-dataframe/. The queryable data structure object generated by server computing device 200 allows for both column-wise and row-wise queries. For example, the data structure object can be traversed using any of a number of different query languages to identify information about the borderless table—such as: names of checkbox columns, names of non-checkbox columns, rows where particular checkbox columns are checked, which checkbox columns are checked/unchecked/N/A for a particular row, and the dependencies of checkbox columns for a particular row.

In some embodiments, server computing device 200 stores the generated data structure in storage 206 and/or transmits the generated data structure to user device 250. For example, a user at client device 250 can provide a textual electronic document to server computing device 200, which parses the document to detect borderless checkbox tables in the document and generate corresponding data structures as described above. Server computing device 200 returns the data structure(s) to client device 250, where processor 252 can generate one or more user interface elements to enable a user of client device 250 to analyze and query the data structure(s) generated from the document.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for extracting borderless checkbox tables from electronics documents, the method comprising:
    detecting, by a server computing device, a plurality of checkboxes in a textual electronic document;
    extracting, by the server computing device, a plurality of text blocks from the textual electronic document;
    identifying, by the server computing device, one or more table headers corresponding to at least one borderless checkbox table in the textual electronic document based on the text blocks;
    determining, by the server computing device, a table boundary corresponding to the at least one borderless checkbox table based on the table headers;
    identifying, by the server computing device, a plurality of table rows and a plurality of table columns corresponding to the at least one borderless checkbox table based on the table boundary and the plurality of checkboxes;
    identifying, by the server computing device, a plurality of table cells corresponding to the at least one borderless checkbox table based on the plurality of table rows and the plurality of table columns; and
    generating, by the server computing device, a data structure comprising data representing the at least one borderless checkbox table based on at least the plurality of table cells and the plurality of checkboxes.

2. The computerized method of claim 1, wherein the server computing device is further configured to process an image-based electronic document into the textual electronic document using optical character recognition.

3. The computerized method of claim 1, wherein the server computing device is further configured to determine a plurality of page header coordinates corresponding to a plurality of page headers of the textual electronic document and a plurality of page footer coordinates corresponding to a plurality of page footers of the textual electronic document.

4. The computerized method of claim 1, wherein the server computing device is further configured to determine a plurality of bullet coordinates, each bullet coordinate corresponding to a bullet of a line of the textual electronic document.

5. The computerized method of claim 4, wherein the server computing device is configured to determine the table boundary based on at least the plurality of coordinates corresponding to the plurality of checkboxes and the plurality of bullet coordinates.

6. The computerized method of claim 1, wherein the server computing device is further configured to determine a plurality of indentation levels, each indentation level corresponding to an indentation of a line of the textual electronic document.

7. The computerized method of claim 6, wherein the server computing device is configured to determine the table boundary based on at least the plurality of coordinates corresponding to the plurality of checkboxes and the plurality of indentation levels.

8. The computerized method of claim 1, wherein the server computing device is further configured to merge a plurality of identified table headers of the plurality of table headers corresponding to a plurality of consecutive lines.

9. The computerized method of claim 1, wherein the server computing device is configured to detect the plurality of checkboxes using a Hough transformer.

10. The computerized method of claim 1, wherein each of the plurality of text blocks is separated by a pattern of whitespace.

11. A system for extracting borderless checkbox tables from electronics documents, the system comprising a server computing device communicatively coupled to a user device and a database over a network, the server computing device comprising a memory for storing computer-executable instructions and a processor that executes the computer-executable instructions to:
  detect a plurality of checkboxes in a textual electronic document;
  extract a plurality of text blocks from the textual electronic document;
  identify one or more table headers corresponding to at least one borderless checkbox table in the textual electronic document based on the text blocks;
  determine a table boundary corresponding to the at least one borderless checkbox table based on the table headers;
  identify a plurality of table rows and a plurality of table columns corresponding to the at least one borderless checkbox table based on the table boundary and the plurality of checkboxes;
  identify a plurality of table cells corresponding to the at least one borderless checkbox table based on the plurality of table rows and the plurality of table columns; and
  generate a data structure comprising data representing the at least one borderless checkbox table based on at least the plurality of table cells and the plurality of checkboxes.

12. The system of claim 11, wherein the server computing device is further configured to process an image-based electronic document into the textual electronic document using optical character recognition.

13. The system of claim 11, wherein the server computing device is further configured to determine a plurality of page header coordinates corresponding to a plurality of page headers of the textual electronic document and a plurality of page footer coordinates corresponding to a plurality of page footers of the textual electronic document.

14. The system of claim 11, wherein the server computing device is further configured to determine a plurality of bullet coordinates, each bullet coordinate corresponding to a bullet of a line of the textual electronic document.

15. The system of claim 14, wherein the server computing device is configured to determine the table boundary based on at least the plurality of coordinates corresponding to the plurality of checkboxes and the plurality of bullet coordinates.

16. The system of claim 11, wherein the server computing device is further configured to determine a plurality of indentation levels, each indentation level corresponding to an indentation of a line of the textual electronic document.

17. The system of claim 16, wherein the server computing device is configured to determine the table boundary based on at least the plurality of coordinates corresponding to the plurality of checkboxes and the plurality of indentation levels.

18. The system of claim 11, wherein the server computing device is further configured to merge a plurality of identified table headers of the plurality of table headers corresponding to a plurality of consecutive lines.

19. The system of claim 11, wherein the server computing device is configured to detect the plurality of checkboxes using a Hough transformer.

20. The system of claim 11, wherein each of the plurality of text blocks is separated by a pattern of whitespace.

* * * * *